(12) United States Patent
Shiraishi et al.

(10) Patent No.: US 6,331,887 B1
(45) Date of Patent: Dec. 18, 2001

(54) OUTDOOR RANGE FINDER

(75) Inventors: Kazunari Shiraishi; Hitoshi Wakisako; Yoshinaga Maruyama; Kyoji Yano; Moriyuki Nakashima, all of Fukuoka (JP)

(73) Assignees: Kabushiki Kaisha Yaskawa Denki; Kyushu Electric Power Co., Ltd., both of Fukuoka (JP)

( * ) Notice: Subject to any disclaimer, the term of this patent is extended or adjusted under 35 U.S.C. 154(b) by 0 days.

(21) Appl. No.: 09/355,707

(22) PCT Filed: Feb. 12, 1998

(86) PCT No.: PCT/JP98/00594

§ 371 Date: Sep. 23, 1999

§ 102(e) Date: Sep. 23, 1999

(87) PCT Pub. No.: WO98/36238

PCT Pub. Date: Aug. 20, 1998

(30) Foreign Application Priority Data

Feb. 14, 1997 (JP) .......................................... 9-47366

(51) Int. Cl.$^7$ ................. G01C 3/00; G01C 3/08; H04N 7/00; H04N 7/18
(52) U.S. Cl. .................. 356/3.03; 356/5.04; 348/31; 348/135
(58) Field of Search ................. 356/3.01–3.16; 348/135, 31

(56) References Cited

U.S. PATENT DOCUMENTS 3,463,588 * 8/1969 Meyerand, Jr. et al. .
4,274,735 * 6/1981 Tamura et al. .

FOREIGN PATENT DOCUMENTS 6-344144 A * 12/1994 (JP) .
8-177263 A * 7/1996 (JP) .

* cited by examiner

Primary Examiner—Stephen C. Buczinski
(74) Attorney, Agent, or Firm—Jordan and Hamburg LLP

(57) ABSTRACT

The present invention is a distance measuring device having a low power laser for use outdoors. The distance measuring device of the invention includes a laser emitting means that emits a pulsed laser beam to an object to be measured and an image reader that takes in irradiations images and stop period images of the object synchronously with an irradiation and stop period of the laser beam. A processing device then subtracts the stop image pixel values from the emission image pixel values to produce differential images. A minimum value image of the differential images is processed and binarized using a binary threshold to produce binary data from which a position where the laser beam is received is found. A calculation apparatus then determines a distance between the laser beam receiving position and the object based on the position where the laser beam is received.

18 Claims, 4 Drawing Sheets

OUTDOOR RANGE FINDER

TECHNICAL FIELD

The present invention relates to a range finder for an outdoor use, specifically to a range finder that calculates a distance by the light-section method.

BACKGROUND ART

The range finder has been diversified in these days, where the non-contact measuring method such as the light propagation time measuring method and binocular stereopsis method, etc., has been employed more frequently than the contact measuring method. Specially in terms of the accuracy, the light-section method has been prevailing in the application fields such as the robot handling, etc.

Hereafter, a construction of a general measuring equipment using the light-section method will be explained. FIG. 4 illustrates a construction of a conventional range finder using the light-section method. A laser beam projector 301 emits a laser beam on an object 302 to be measured. When a CCD camera 303 takes an image of the object 302, a position of the laser beam spot projected on the CCD camera 303 varies depending on a position of the object 302 (triangulation method). In order to measure the position of the laser beam spot, an analog video signal on the CCD camera 303 is converted into a digital signal by an A/D converter 304. The digital signal is converted into a binary image data by a binarizing circuit 306 on the basis of a predetermined threshold 305. A labeling unit 307 applies the labeling processing to this binary image data, and a centroid detection unit 308 detects a centroid of the image data, whereby the position of the laser beam spot on the image can be detected. If the position of the laser beam spot on the image is detected, a distance calculation unit 310 is able to calculate the distance by using optical parameters (focal length, distance between the laser projector 301 and the CCD camera 303, and angle formed by the two) or a calibration table 309.

Here, in the conventional construction, it is a premise that the image of the laser beam spot projected on the CCD camera 303 is brighter than those of the other parts on the image; however in the outdoors, in a place where the brightness is influenced by the sunbeam, the output power of the laser is inevitably raised, which leaves a problem in terms of safety. Further, since the intensity of illumination complicatedly varies in the outdoors, the threshold cannot be predetermined.

Accordingly, the inventor proposed an equipment in which the coordinate transformation processing is applied concurrently to the image information obtained from a CCD camera, and thereafter the superposition processing is applied to the image with the coordinate transformed, whereby the surrounding light is removed and only the laser beam is identified (see JP-A 8-94322).

However, still in this proposal, when a moving object comes in, or when a background object swings owing to the wind or the like, the images influenced by the moving objects cannot be removed, and are left as noises.

DISCLOSURE OF THE INVENTION

Therefore, it is an object of the invention to provide an equipment that is able to measure a distance with a low power laser without noises remained, when a moving object comes in, or when a background object swings by the influence of the wind.

To accomplish this object, the invention comprises:

a laser emitting means that emits a pulse laser beam to an object to be measured, an image reading means that takes in an image of the object synchronously with an emission and stop of the laser beam, a means that requires a plurality of differential images between the images read by a plurality of emissions and stops of the laser beam, a means that detects a minimum value of said plurality of differential images, a means that determines a binary threshold from the minimum value of the differential images, and a means that makes a binary data from the minimum value of the differential images, and detects a position where the laser beam is received.

BEST MODE FOR CARRYING OUT THE INVENTION

Figure 1:
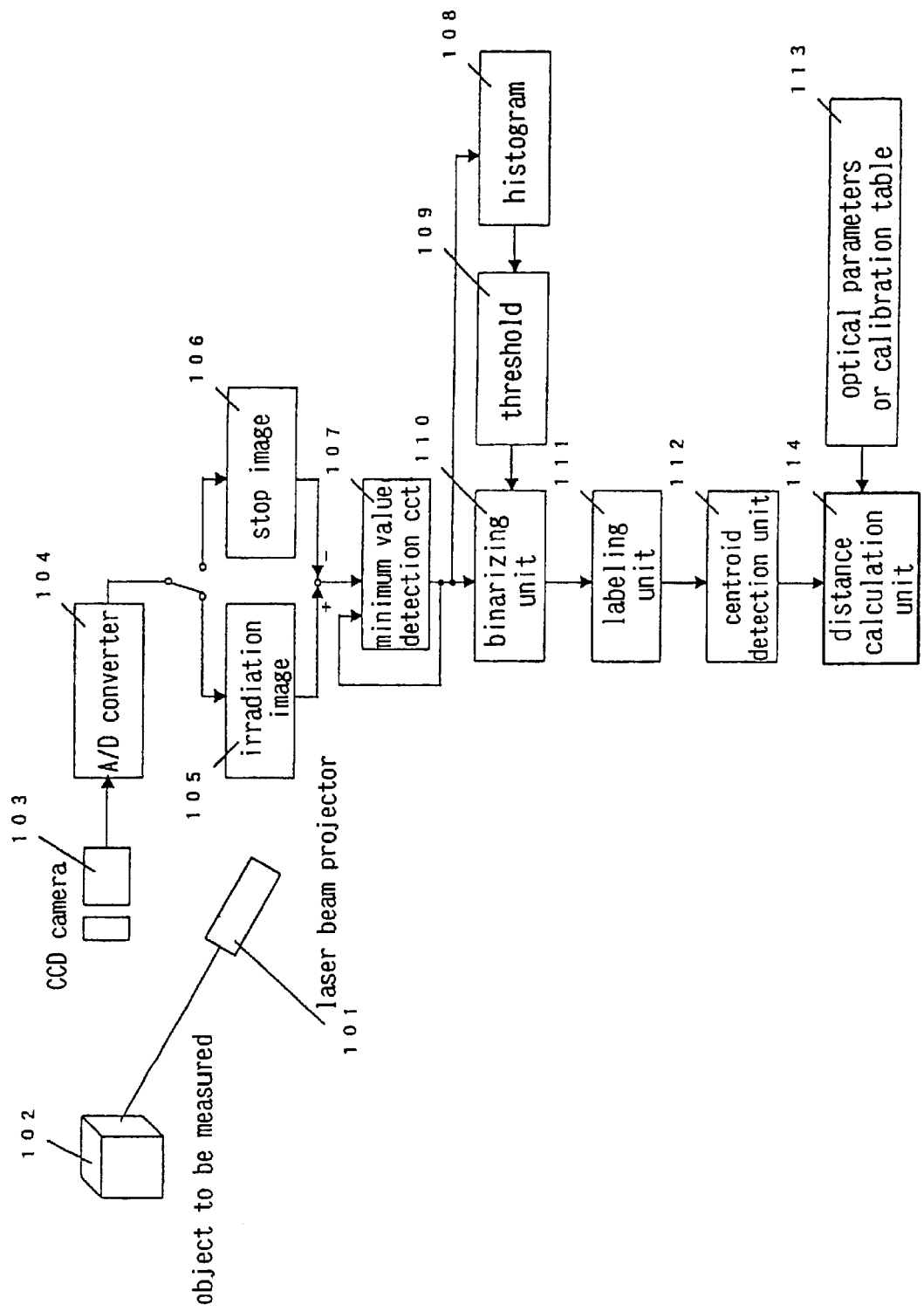
FIG. 1 is a block diagram of a range finder in one embodiment of the invention.

One embodiment according to the invention will be described with reference to the accompanying drawings. FIG. 1 illustrates a construction of a range finder of this embodiment. In the drawing, 101 signifies a laser beam projector, 102 an object to be measured, 103 a CCD camera, 104 an A/D converter, 105 an irradiation image, 106 a stop image, 107 a minimum value detection circuit, 108 a histogram, 109 a threshold, 110 a binarizing unit, 111 a labeling unit, 112 a centroid detection unit, 113 optical parameters or a calibration table, and 114 a distance calculation unit.

In this embodiment, the laser beam projector 101 emits and stops the laser beam to the object 102 for several times, and the CCD camera 103 takes the image of the object 102 synchronously with the emissions and stops of the laser beam.

The A/D converter 104 converts an analog video signal into a digital data, and stores the irradiation image 105 during the emission of the laser beam and the stop image 106 during the stop of the emission in separate memories. The differential images are obtained by subtracting the stop image 106 from the irradiation image 105 for each emission and stop of the laser beam. The minimum value detection circuit 107 detects the minimum value of the differential images for each pixel.

Figure 2:
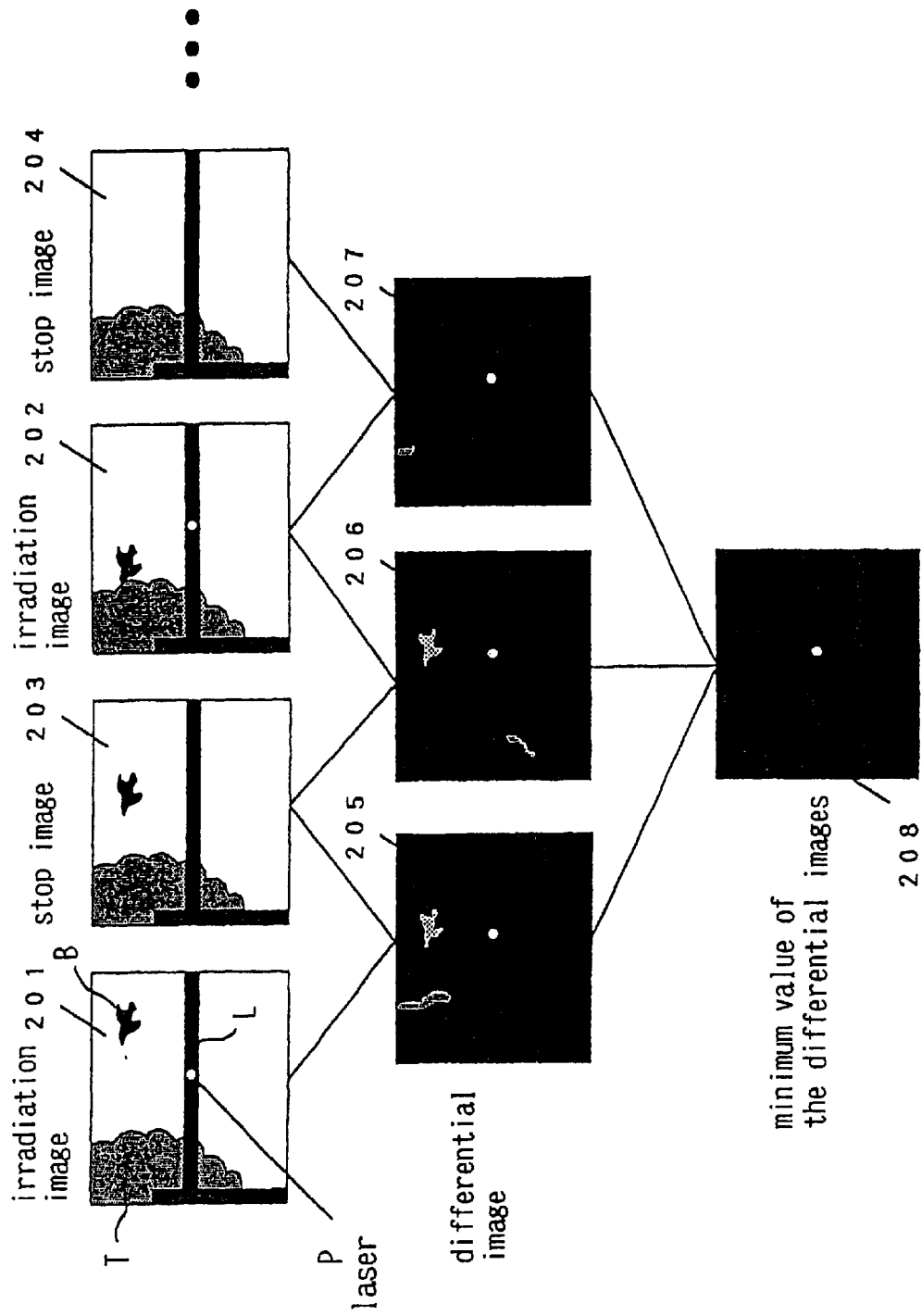
FIG. 2 is a chart to illustrate images by this embodiment.

FIG. 2 illustrates an example of the images to be taken in. The images during the emission of the laser beam are illustrated in 201 through 202, and the images during the stop of the laser beam are illustrated in 203 through 204. In the outdoor images, the sunbeam contains the wavelength components of the laser beam. Therefore, even if a bandpass filter to permeate only the wavelength components of the laser beam is used, the images other than the spot image of the laser beam are taken in. The differential images obtained by subtracting the image during the stop from the image during the emission of the laser beam are illustrated in 205 through 207. The laser beam image is observed in each of the differential images, and disturbances are created at a place where the image varies at each interval of taking the images, namely, a place where there is a movement in the image ('bright' during the emission of the laser beam, 'dark' during the stop). The minimum value of these differential images 205 through 207 is calculated for each pixel, and thereby the disturbances are removed and only the spot image of the laser beam is extracted (208).

The data of this "minimum value of the differential images", not consisting of one bit, includes the gradation. Therefore, the binarizing threshold 109 can be determined dynamically by the histogram 108, and the binary image (black-and-white image) can be generated by using the most appropriate threshold even under an outdoor environment with a high fluctuation of illumination. That is, the "minimum value of the differential images" being a light-and-shade image is converted into a white with regard to the (bright) pixel of a higher level than the threshold, and is converted into a black with regard to the (dark) pixel of a lower level than that, whereby the binary image of only black and white is generated (binarizing circuit 110). To each of the coupling components of the binary image, labels of different names are assigned, and the block of white region is extracted (labeling unit 111). To acquire the position of each pixel of the block will make it possible to calculate the position of the centroid of the block, namely, the position where the laser beam is projected on the CCD camera (centroid detection unit). The centroid position is calculated by the following equation.

$$(\bar{x}, \bar{y}) = \frac{1}{N} \sum_{K=1}^{N} (x_K, y_K)$$

Figure 3:
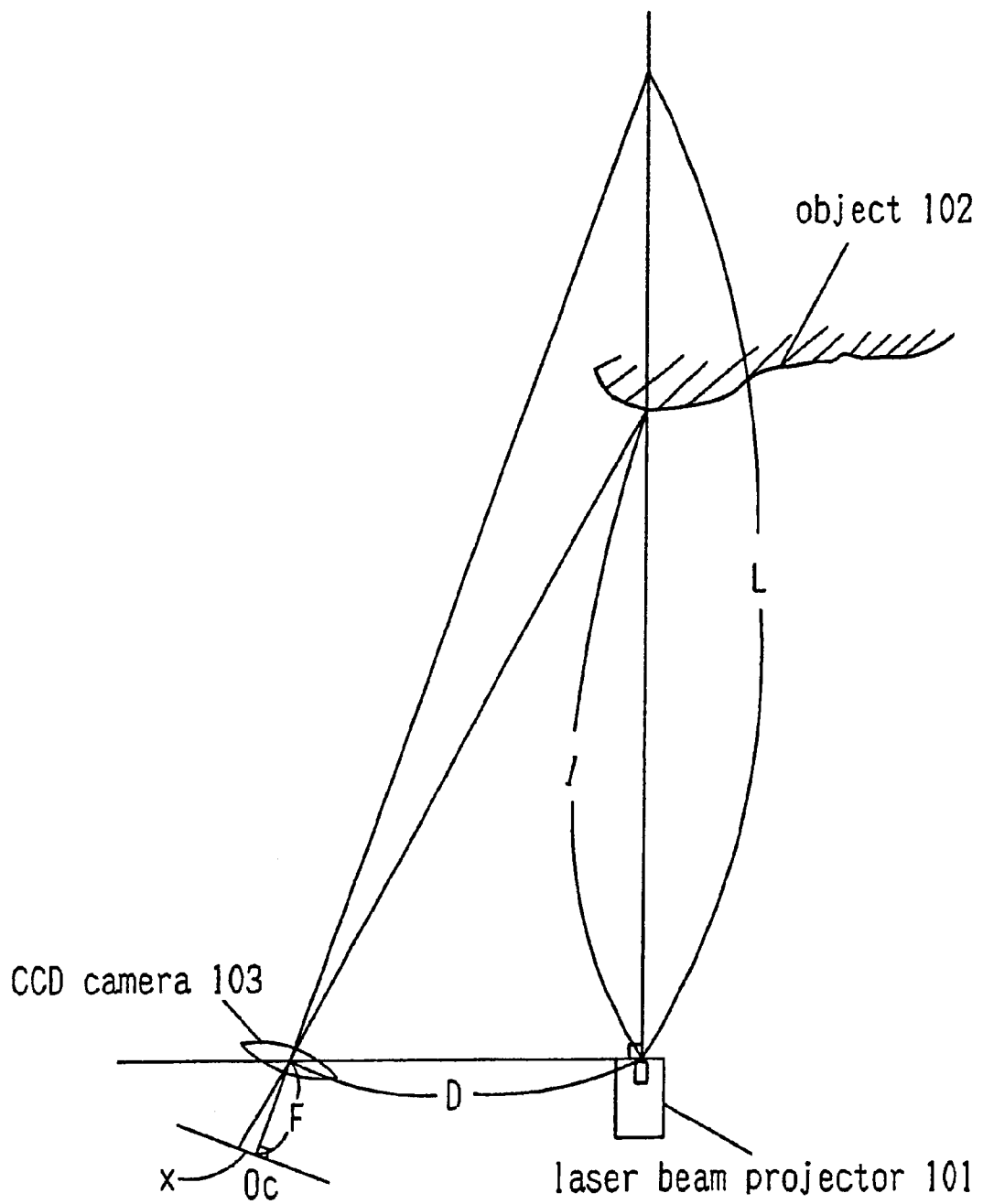
FIG. 3 is a chart to explain the calculation of a distance in the invention.

($\bar{x}$, $\bar{y}$): centroid position ($x_K$, $y_K$): position of a pixel belonging to the block N: number of pixels belonging to the block If this position is detected, the calculation of a distance becomes possible by the theory of the triangulation, using the optical parameters (focal length, distance between the laser beam projector 101 and the CCD camera 103 in the installation, and angle formed by the two), or using the calibration table that presents the relation between a position projected on the CCD camera and a distance (distance calculation unit 114). A calculation example of a distance will be shown when the optical parameters are used. The distance calculation in this case is illustrated in FIG. 3.

$$L = \frac{D(FL - Dxh)}{DF + Lxh}$$

l: distance from the laser beam projector 101 to the object 102

L: distance from the laser beam projector 101 to a point where the laser beam meets the optical axis of the CCD camera 103 x: position (centroid position of the block) of a spot image of the laser beam projected on the CCD camera 103 h: size of a pixel

D: distance between the laser beam projector 101 and the CCD camera 103

The function of this invention when the object is assumed to be a transmission line will be described with reference to FIG. 2.

On the background of the transmission line L (illustrated slightly thicker for explanation) are a shade tree T and a flying bird B; and at a specific position on the line L is projected a laser beam P by the laser beam projector 101 shown in FIG. 1. The irradiation image 201 shows this aspect.

Next, stopping the emission of the laser beam P obtains the stop image 203. At this moment, the bird B is flying, and the leaves of the shade tree T are swinging by the wind.

Therefore, the differential image between the irradiation image 201 and the stop image 203 becomes an image 205. That is, the differential image remains in the spot of the laser beam P, bird B, and part of leaves of the shade tree T swung by the wind.

Next, restarting the emission of the laser beam P obtains the irradiation image 202. At this moment, the bird B has moved and the leaves of the shade tree T are moving to receive the wind.

Therefore, the differential image between the stop image 203 and the irradiation image 202 becomes an image 206. That is, the differential image remains in the spot of the laser beam P, bird B, and part of leaves of the shade tree T swung by the wind.

Next, stopping the emission of the laser beam P obtains the stop image 204. At this moment, the bird B is moved to disappear from the picture screen, and the leaves of the shade tree T is moving.

Therefore, the differential image between the irradiation image 202 and the stop image 204 becomes an image 207. That is, the differential image remains in the spot of the laser beam P, and part of leaves of the shade tree T swung by the wind.

Finally, to calculate the minimum value of the differential images 205, 206, 207 (each pixel includes shade values) obtains an image 208 as the minimum value. In the image 208 as the minimum value, only the laser beam P secures a high intensity.

Thereby, the background by the sunbeam does not give any influence as disturbances, and only the irradiation point by the laser beam can be extracted.

Thus, the invention will implement an outdoor range finder capable of detecting only the laser beam image even with a low power laser in an environment with a high fluctuation of illumination.

INDUSTRIAL APPLICABILITY

The invention is extremely effective for use in a range finder of an object work necessary for a robot system that works outdoors, and the like.

FIG. 1:

101—laser beam projector,

102—object to be measured,

103—CCD camera,

104—A/D converter,

105—irradiation image,

106—stop image,

107—minimum value detection circuit,

108—histogram,

109—threshold,

110—binarizing unit,

111—labeling unit,

112—centroid detection unit,

113—optical parameters, or calibration table,

114—distance calculation unit

Figure 4:
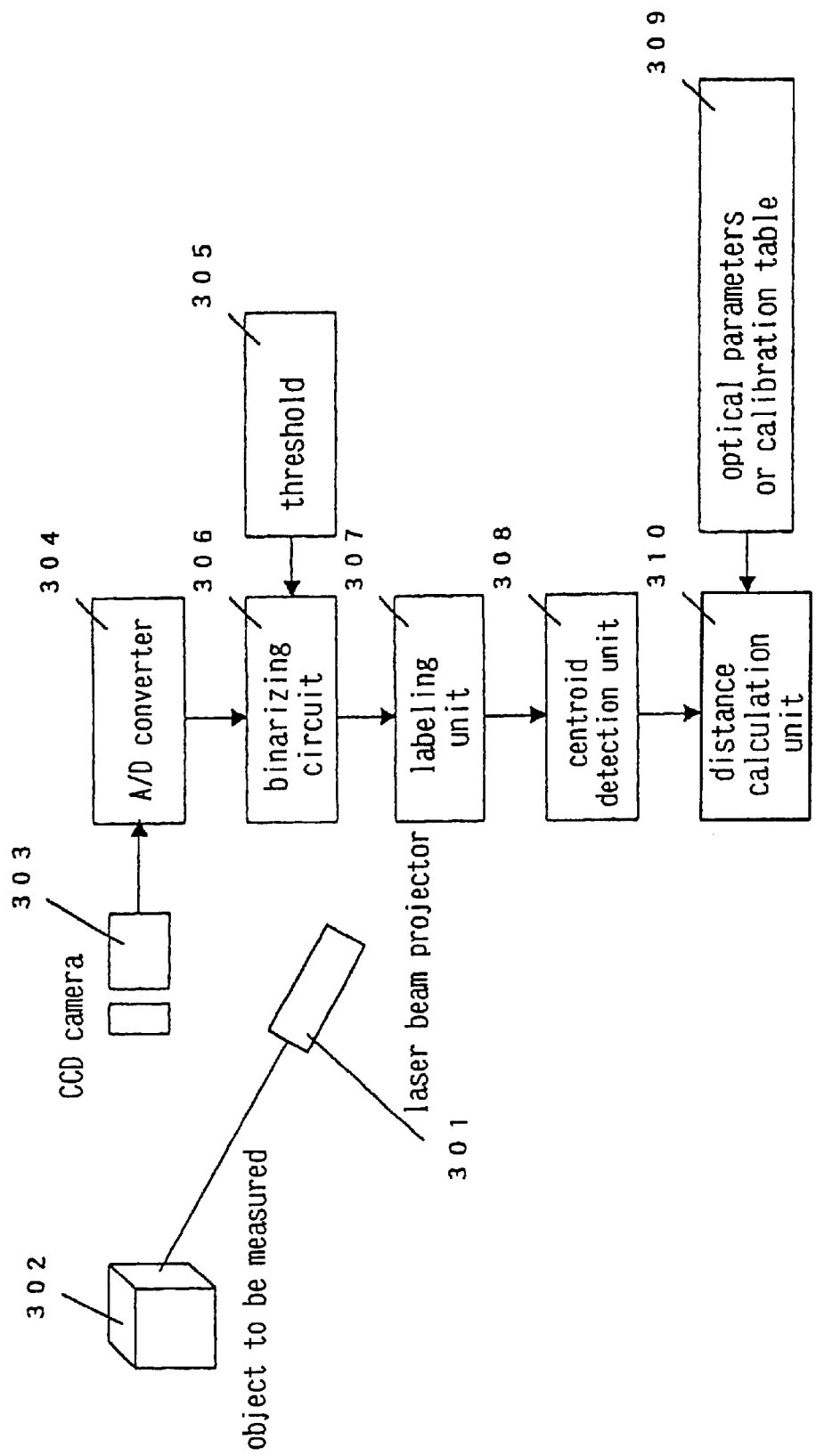
FIG. 4 is a block diagram of a range finder in the conventional technique.

FIG. 2:

201, 202—irradiation image, 203, 204—stop image, 205, 206, 207—differential image,
208—minimum value of the differential images
FIG. 3:
laser beam projector 101,
object 102,
CCD camera 103
FIG. 4:
301—laser beam projector,
302—object to be measured,
303—CCD camera,
304—A/D converter,
305—threshold,
306—binarizing circuit,
307—labeling unit,
308—centroid detection unit,
309—optical parameters, or calibration table,
310—distance calculation unit

What is claimed is:

1. An outdoor range finder for finding a distance to an object, comprising:
    a laser emitting means that emits a pulse laser beam to an object to be measured;
    an image reading means that takes in a plurality of images of the object synchronously with emission periods and off periods of the laser beam;
    a means for producing a plurality of differential images from differences between ones of the images read during the emission periods and other ones of the images read during the off periods;
    a means that detects minimum value data of corresponding pixels of said plurality of differential images;
    a means that determines a binary threshold from the minimum value of the differential images;
    a means that makes a binary data from the minimum value data of the differential images, and detects a position where the laser beam is received; and
    means for determining a distance between said laser emitting means and said object based on the position where the laser beam is received.

2. A range finder for measuring a distance to an object, comprising:
    a laser emitting a pulse laser beam to the object to irradiate the object during irradiation periods and not irradiating the object during off periods;
    an image reading unit imaging the object to produce irradiated images of the object during the irradiation periods and non-irradiated images of the object during the off periods;
    an image processing unit for producing differential images from pairs of ones of said irradiated images and ones of said non-irradiated images;
    a detecting unit detecting a minimum value of corresponding pixels of the differential images and producing minimum value image data therefrom;
    a first determining unit for determining a binary threshold from the minimum value image data;
    a binarizing unit for binarizing said minimum value image data using said binary threshold and detecting a received position at which the pulse laser beam is received; and
    a second determining unit for determining a distance between said laser and said object based on said received position of the laser.

3. The range finder of claim 2, wherein said image processing unit produces said differential images by subtracting said ones of said non-irradiated images from said ones of said irradiated images.

4. The range finder of claim 3, wherein said pairs are sequential pairs.

5. The range finder of claim 4, wherein said differential images include at least three differential images.

6. The range finder of claim 5, wherein:
    said ones of said non-irradiated images are two of said non-irradiated images; and
    said ones of said irradiated images are two of said irradiated images.

7. The range finder of claim 2, wherein said differential images include at least three differential images.

8. The range finder of claim 7, wherein:
    said ones of said non-irradiated images are two of said non-irradiated images; and
    said ones of said irradiated images are two of said irradiated images.

9. The range finder of claim 2, wherein:
    said ones of said non-irradiated images are two of said non-irradiated images; and
    said ones of said irradiated images are two of said irradiated images.

10. A range finder for measuring a distance to an object, comprising:
    a laser emitting a pulse laser beam to the object to irradiate the object during irradiation periods and not irradiating the object during off periods;
    an image reading unit imaging the object to produce irradiated images of the object during the irradiation periods and non-irradiated images of the object during the off periods;
    an image processing unit for producing differential images from pairs of ones of said irradiated images and ones of said non-irradiated images;
    a detecting unit detecting a minimum value of corresponding pixels of the differential images and producing minimum value image data therefrom;
    a position determining unit for calculating a received position at which the pulse laser beam is received; and
    a distance calculating unit for determining a distance between the laser and said object based on said received position of the pulse laser beam.

11. The range finder of claim 10, the position determining unit includes a binarizing unit for binarizing said minimum value image data to produce binarized minimum value image data and said position determining unit determines said received position of the pulse laser beam based on said binarized minimum value image data.

12. The range finder of claim 11, wherein said image processing unit produces said differential images by subtracting said ones of said non-irradiated images from said ones of said irradiated images.

13. The range finder of claim 12, wherein said differential images included at least three differential images.

14. The range finder of claim 13, wherein:
    said ones of said non-irradiated images are two of said non-irradiated images; and
    said ones of said irradiated images are two of said irradiated images.

15. The range finder of claim 10, wherein said differential images include at least three differential images.

16. The range finder of claim 15, wherein:
    said ones of said non-irradiated images are two of said non-irradiated images; and said ones of said irradiated images are two of said irradiated images.

17. The range finder of claim 10, wherein:

said ones of said non-irradiated images are two of said non-irradiated images; and said ones of said irradiated images are two of said irradiated images.

18. The range finder of claim 10, the position determining unit includes a threshold determining unit for determining a threshold value from the minimum value image data and said position determining unit determines said received position of the pulse laser beam based on said threshold value.

* * * * *